Patented June 7, 1949

2,472,666

UNITED STATES PATENT OFFICE 2,472,666

PRODUCTION OF DYE INTERMEDIATES

Robert Mitchell Leekley, Chicago, Ill., assignor to E. I. du Pont de Nemours & Company, Wilmington, Del., a corporation of Delaware No Drawing. Application May 16, 1946, Serial No. 670,309

4 Claims. (Cl. 260—338)

This invention relates to new heterocyclic organic compounds and especially to phthalideneacetamides.

An object of this invention is to provide a new class of phthalideneacetamide compounds. A further object is to produce such compounds which are useful in processes of color photography. A still further object is to produce phthalideneacetamides of aromatic amines which contain a functional group capable of reacting with hydroxyl polymers. Another object is to produce new dye intermediates or color formers which can be used to form colored images during the chromogenic development of silver salt photographic images. Still other objects will be apparent from the following description of the invention.

It has been found that phthalideneacetyl chlorides can be reacted with an amino compound having at least one free hydrogen atom attached to the amino-nitrogen atom in a solvent or diluent medium to form a new class of amides having the following general structure:

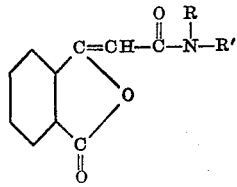

(1)

wherein R is hydrogen or a monovalent hydrocarbon radical and R' is the residue of an organic amine of the formula

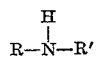

Thus R' constitutes the atoms which with the amino radical

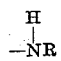

form a primary or secondary amine.

The preferred compounds of the invention are formed by interaction of the phthalideneacetyl chloride with primary or secondary aromatic amines and they may be represented by the general formula:

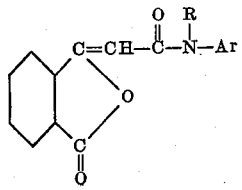

(2)

where R is hydrogen or a monovalent hydrocarbon radical and Ar is the carbocyclic nucleus of an aromatic hydrocarbon.

In Formulae 1 and 2 above, the benzene nucleus of the phthalidene nucleus may contain various substituent groups usual in color formers. R may be an alkyl radical, e. g., methyl, ethyl, dodecyl; cycloalkyl, e. g., cyclohexyl; aryl, e. g., phenyl, naphthyl; chlorphenyl, etc. Ar may be an unsubstituted aryl radical, e. g., phenyl, alpha-naphthyl, beta-naphthyl, or such a radical substituted by unreactive groups, e. g., alkyl radicals, halogen atoms, or with functional groups which do not destroy the color-coupling function, e. g., an aldehyde group (—CHO) or an acetal thereof with an alkanol of 1 to 4 carbons or a 1,2-or 1,3-dihydroxyalkane of 1 to 4 carbon atoms.

A narrow and important class of compounds obtainable by the process described above consists of the phthalideneacetamidobenzaldehydes of the formula:

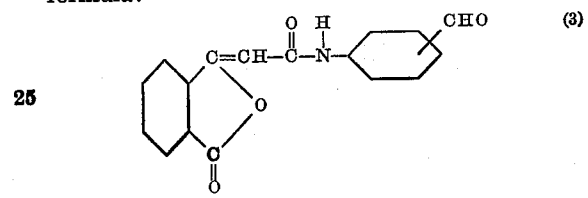

(3)

and their acetals with the aforedescribed alkanols and alkanediols. These compounds when reacted with hydroxyl polymers, such as polyvinyl alcohol, partially hydrolyzed polyvinyl acetate, chloracetate, isobutyrate, etc., or the hydrophilic partially hydrolyzed ethylene/vinyl acetate interpolymers described in United States Patent 2,386,347, produce a novel class of polymeric color formers which are fast to diffusion in colloid layers of photographic elements. When they are reacted with the hydroxyl polymers they do not interact with themselves, nor do the resulting polymeric color formers interact to produce highly insoluble cross-linked molecules.

The phthalideneacetyl chloride used as the acylating reactant in the above process can readily be obtained from phthalideneacetic acid which may advantageously be prepared by the condensation of phthalic anhydride with acetic anhydride. The phthalideneacetic acid can be converted into the corresponding acid chloride after the manner described by Gabriel (Ber. 57, page 305), by treatment with phosphorous oxychloride. Another practical method, described below in more detail, comprises reacting phthalideneacetic acid and thionyl chloride. The corresponding bromides can be made in like manner from phosphorous oxybromide or thionyl bromide.

The reactivity of phthalideneacetyl chloride with amines to produce amides is somewhat surprising in view of the fact that the corresponding free acid cannot be used as an acylating reactant. On the contrary, when reacted with ammonia and amines, e. g., methylamine, no amides are formed. Instead phthalimidineacetic acid and benzoylacetic acid ortho-N-methyl carbonamide are formed respectively. Similarly ethylamine and propylamine yield salts of the corresponding N-alkyl-phthalideneacetic acid, whereas aniline yields o-acetyl-N-phenylbenzamide. In all cases where the free acid is used it attacks and destroys the enol-lactone ring.

It has been found, however, that phthalideneacetyl halides, e. g., the chloride, are good acylating reactants and form amides with primary and secondary amines of both aromatic and aliphatic types. The reaction is easy to control and is preferably carried out at relatively low temperatures, e. g., from $-5°$ C. to $10°$ C. However, higher temperatures can be used.

The proportions of the phthalideneacetyl chloride and the amino compound can be varied. Either the amino compound or the chloride may be in excess. In general substantially equimolecular proportions are preferred.

The invention will be further illustrated by the following examples. All parts are by weight.

Example I

A mixture of 103 parts of phthalideneacetic acid and 800 parts of thionyl chloride is heated under reflux until the phthalideneacetic acid entirely dissolves. The excess thionyl chloride is removed by distillation, using vacuum to remove the last traces, leaving a quantitative yield of phthalideneacetyl chloride. After crystallizing once from benzene the phthalideneacetyl chloride melts at $153°-154°$ C. Gabriel (Ber. 57, page 305) reports $158°$ C. Analysis: Calculated for $C_{12}H_5O_3Cl$: $Cl=17.0$; found: $Cl=16.53$.

A mixture of 14.0 parts of potassium carbonate, 30 parts water, 20 parts dioxane, and 16.8 parts of meta-aminobenzaldehyde ethylene glycol acetal is placed in a reactor which is fitted with a stirrer, thermometer, and means for cooling to $5°$ C. The mixture is maintained at $5°$ C. while a solution of 20.9 parts of phthalideneacetylchloride in 100 parts dry dioxane (warmed to dissolve the acid chloride) is added at such a rate that the temperature can be maintained at $5°$ C. Stirring is continued for one hour longer while cooling and for an additional hour while the reaction mixture is warmed up to room temperature. The product is filtered off and dried in a vacuum desiccator overnight. The product, meta-(phthalideneacetamido)benzaldehyde ethylene glycol acetal (31.5 parts), is crystallized from 330 parts of acetone to yield a yellow crystalline product melting at $160°$ to $162°$ C. Further recrystallization does not change the melting point. Analysis: calculated for $C_{19}H_{15}O_5N$: $C=67.65$, $H=4.49$, $N=4.15$; found: $C=67.53$, $H=4.50$, $N=3.96$, 4.03. It has the structural formula:

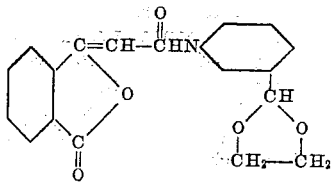

Two parts of this compound were dissolved in hot acetone and added to 1000 parts of a developer of the composition given in Example III. An exposed film bearing a silver halide emulsion layer developed in the resulting solution gave a clear yellow picture of good quality.

Example II

To a refluxing solution of 16.5 parts of meta-(phthalideneacetamido)benzaldehyde ethylene glycol acetal in 250 parts of acetone is added 20 parts of 1 N hydrochloric acid. A solid starts to precipitate almost immediately. After 30 minutes the mixture is cooled and filtered to yield 14.1 parts (98%) of m-(phthalideneacetamido)benzaldehyde melting after crystallization at $231°$ to $233°$ C. Another recrystallization does not change the melting point. Analysis: calculated for $C_{17}H_{11}O_4N$: $C=69.62$, $H=3.70$, $N=4.79$. Found: $C=70.11$, $69.26$; $H=4.13$, $3.69$; $N=4.72$, $4.75$. It has the formula:

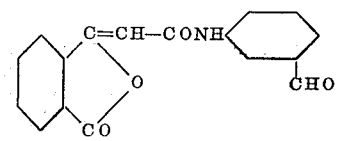

When an alkaline solution of this compound is coupled with a solution of oxidized p-aminodiethyl-aniline, a yellow dye is produced.

Example III

A mixture of 14 parts of polyvinyl alcohol (a completely hydrolyzed polyvinyl acetate) having a 4% aqueous solution viscosity of 18 to 24 centipoises at $20°$ C., 4 parts of meta-(phthalidenecetamido)benzaldehyde prepared as in Example II, 100 parts of dimethyl formamide, and 0.85 part 85% phosphoric acid is stirred in a water bath at $80°$ C. for eight hours. The finely divided product is filtered off and washed three times with hot dimethylformamide and with methanol. A solution is prepared by stirring at $50°$ C. for one hour 10 parts of this polymer, 40 parts of ethanol, 150 parts of water, and sufficient sodium hydroxide to raise the pH to 8.5. To one-half of the solution is added 31 parts of 3 N ammonium bromide and two parts of 0.5 N potassium iodide. The mixture is stirred at $40°$ C. while adding a solution of 29 parts of 3 N silver nitrate, 50 parts of water, and 17 parts of 28% ammonium hydroxide during one minute. After stirring for a total of one-half hour, 150 parts of 15% sodium sulfate solution is added. The precipitated silver halide color-former emulsion is washed for one hour in running water after which the excess water is drained off. The remainder of the original polymer solution is added and the mixture stirred for one-half hour at $65°$ C. After cooling to $25°$ C., the emulsion is coated on baryta-sized white paper. The resulting paper is exposed to form a latent image, and then developed in a solution of the following composition prepared by dissolving the ingredients in 500 parts of water and diluting to 1000 parts:

| | Parts |
|---|---|
| p-Aminodiethylaniline hydrochloride | 2 |
| Sodium sulfite (anhydrous) | 10 |
| Sodium carbonate (anhydrous) | 20 |
| Potassium bromide | 2 |
| Water to | 1,000 |

The preparation is then washed, bleached in 4% potassium ferricyanide, fixed in 25% sodium thiosulfate, and washed. The resulting paper contains a yellow photographic image.

Example IV

A mixture of 28 parts potassium carbonate, 16 parts of water, 40 parts of dioxane, and 18.6 parts of aniline is reacted with a solution of 31.8 parts of phthalideneacetyl chloride in 200 parts of dioxane by the method described in Example I. The yield of phthalideneacetanilide is 68 parts. After recrystallization from benzene, the product melts at 198° to 200° C. Analysis, Calculated for $C^{16}H^{11}NO^3$: C=72.82, H=4.12, N=5.21. Found: C=71.97, 72.37; H=4.47, 4.46; N=4.97, 5.19. It has the formula:

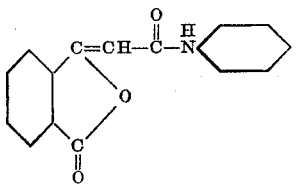

When an alkaline solution of this compound is coupled with a solution of oxidized p-aminodiethylaniline a yellow dye is produced. When a similar alkaline solution is coupled with a solution of diazotized 4-nitroaniline-2-sodium sulfonate an orange dye is produced.

Example V

A mixture of seven parts of potassium carbonate, 15 parts of water, 10 parts of dioxane, and 13 parts of para-dodecylaniline is reacted with a solution of 10.5 parts phthalideneacetyl chloride (prepared as in Example I) in 50 parts of dry dioxane by the procedure described in Example I. Fourteen and two tenths (14.2) parts of alpha-phthalidene-p-dodecylacetanilide are obtained. After recrystallization from benzene, this material has a melting point of 134° C. Analysis, Calculated for $C_{28}H_{35}NO_3$: C=77.54, H=8.15, N=3.33. Found: C=77.13, 77.85; H=8.32, 8.44; and N=3.20, 3.16.

To 500 parts of a photographic emulsion containing 45 parts of silver bromide and as a binder 25 parts of hydrolyzed ethylene/vinyl acetate interpolymer of low ethylene content (described in United States Patent 2,386,347) is added with stirring a solution of 5 parts of alpha-phthalidene-p-dodecylacetanilide in 100 parts of methanol and two parts of 5% sodium hydroxide solution. The emulsion is filtered to remove air bubbles and coated on baryta-sized white paper. The dried paper is exposed to light to form a latent image and then developed as is described in Example III. A strong, bright-yellow photographic image of good light stability is obtained. Similar results are obtained with gelatin silver halide photographic emulsions.

In place of the specific amines described in the above examples, there may be substituted a large number of other amines in equivalent amount. Suitable additional amines include N-methylaniline, p-nitroaniline, alpha-naphthylamine, beta-naphthyl-amine, p-chloraniline, 2,4-dichloraniline, o-anisidine, m-aminobenzaldehyde dimethyl acetal, benzidine, p-stearamidoaniline, dianisidine, 4-aminodiphenyl, m-aminobenzaldehyde polyvinyl alcohol acetal, aminocelluloses as described in United States Patent 2,136,299, deacetylated chitin, and amino resins, e. g., aniline-formaldehyde resins, etc.

When large neutral polymer residues are present, the resulting compounds can be used as binding agents for silver halides for photographic elements. The benzene nucleus of the phthalidene nucleus of the above compounds, as stated above, may be unsubstituted or may contain various substituents used in color formers. Suitable substituents include halogen, e. g., chlorine, bromine; alkyl, e. g., ethyl, dodecyl; aryl, e. g., phenyl and naphthyl, etc. Among the compounds useful in preparing such substituted phthalideneacetamides are tetrachlorophthalic anhydride, 4 - phenylphthalic anhydride and tetraphenyl-phthalic anhydride. These anhydrides can be condensed with acetic anhydride in the same manner that phthalic anhydride is converted to phthalidene acetic acid. The resulting phthalideneacetic acids are then converted to acid halides by means of thionyl chloride or phosphorus oxychloride.

The phthalideneacetamides do not contain an active methylene group and hence will not couple in this form with aromatic primary amino color-developing agents during the development of silver halide images. However, upon treatment with alkaline reagents, e. g., alkali metal hydroxides, the phthalideneacetamides change to salts of ortho-carboxybenzoylacetamides. For example, the compounds of Formula 1 are converted to compounds of the following structure:

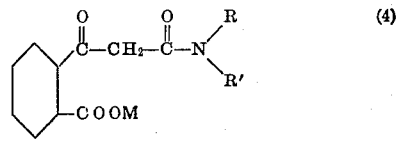

where R and R' have the same significance as in Formula 1 and M is an alkali metal.

Similarly compounds of Formulae 2 and 3 are converted by alkali metal hydroxides to compounds of Formulae 5 and 6 below:

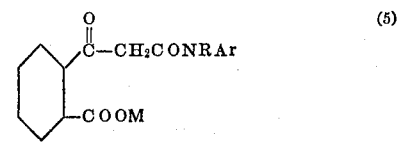

where R and Ar have the same significance as in Formula 2 and M is an alkali metal;

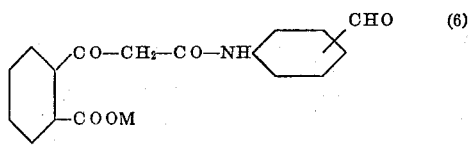

where M is an alkali metal.

The corresponding acids of Formulae 4, 5, and 6 can be obtained by treating the alkali metal salts with acids under suitable conditions. Neutralization with dilute hydrochloric, sulfuric, or acetic acid is sufficient to convert the salts to free acids. The novel compounds of Formulae 1, 2, 3, or 4 may be incorporated with emulsions in the conventional manner by dissolving them in a solvent which does not affect the sensitivity of the emulsion and intimately mixing the same with the colloid, e. g., gelatin, hydroxyl-polymer solution, or emulsion. A small amount of an alkali metal base is sometimes advantageous in obtaining a rapid and uniform dispersion of the color-former throughout the emulsion. Various emulsion components may be present without affecting dye formation. The compounds are remarkably free of deleterious effects on the photographic sensitivity and chromatic response characteristics of silver halide emulsions, e. g., silver chloride, silver bromide, and silver chloro-bromide, silver bromide-iodide, etc., emulsions. They may likewise be used in conjunction with the known sensitizing dyes which render the emulsions sensitive to certain additional wavelength regions of light. They may also be used in conjunction with emulsion desensitizers, surface modifiers, and emulsion hardening agents. They may be used with any of the conventional color-coupling developing agents as described in United States Patent No. 2,319,426.

The usual way of making acylacetamides is to heat amines with acylacetic esters, e. g., acetoacetic ester. This is a high temperature reaction and some amines are unreactive whereas with others side reactions occur. However, if amides are made from acid chlorides the reaction can be carried out at 0° C., often in high yield and with practically any amine. Acid chlorides of acylacetic acids cannot be prepared because the acids are unstable. However, phthalideneacetic acid is stabilized by the enol-lactone ring and the acid chloride can be prepared and can be used to make a great variety of amides.

In a compound of the type of Formula 3, the enol-lactone ring inactivates the active methylene group potentially present so that it cannot react with the aldehyde groups during preparation of polyvinyl acetals. After the formation of the polymeric acetal, treatment with alkali opens the enol-lactone ring not only generating an active methylene group for dye coupling reactions but also forming a carboxyl group to render the compound more soluble in dilute alkali.

In addition phthalideneacetanilides substituted with a long-chain aliphatic group, such as p-dodecylphthalideneacetanilide, are soluble in alkali and can be mixed with photographic emulsions and dispersed by addition of acid.

A very important use of acylacetanilide derivatives is in the coupling with diazonium salts to give the dyes known as "Hansa Yellows," which have the general formula

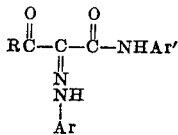

where R is an aliphatic or aromatic radical and Ar and Ar' are aromatic radicals.

A great variety of dyes can be made by varying the Ar, Ar', and R groups. Phthalideneacetamides can be made from many different aromatic amines which are dye intermediates, examples of which have been mentioned above. These derivatives can then be coupled with any of a large number of diazonium salts, such as diazotized aniline, p-nitraniline, p-chloroaniline, 2,4-dimethoxyaniline, sulfanilic acid, anthranilic acid, 2-sulfo-4-nitroaniline. The resulting dyes represent a gradation of colors and suitable substituents will give a variety of shades. These dyes can then be "chromed" to give still other colors. One difficulty in the use of some standard dyes is their insolubility in the conventional dye baths. Solubilizing groups often occur in the Ar and Ar' groups but it sometimes happens for reasons of spectral characteristics that these cannot be present. However, through the use of the phthalideneacetanilide derivatives a solubilizing group is present in the R group when the enol-lactone ring is opened by alkali. Thus, by this invention a new class of acylacetamides are introduced to the dye field thus opening up the possibility of many new colors which were heretofore not useful because of their water insolubility.

As many widely different embodiments of this invention can be made without departing from the spirit and scope thereof, it is to be understood that the invention is not to be limited except as defined by the claims.

What is claimed is:

1. Compounds taken from the class consisting of phthalideneacet monoamido aryl-aldehydes and their acetals with hydroxy compounds taken from the group consisting of alkanols of 1 to 4 carbon atoms and 1,2- and 1,3-alkanediols of 2 to 4 carbon atoms.

2. Phthalideneacetamidobenzaldehydes of the general formula:

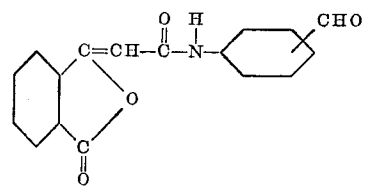

3. The compound of the formula:

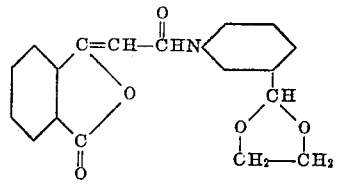

4. The compound of the formula:

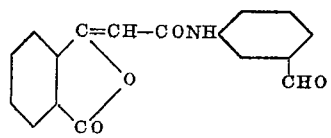

ROBERT MITCHELL LEEKLEY.

REFERENCES CITED

The following references are of record in the file of this patent:

UNITED STATES PATENTS

| Number | Name | Date |
|---|---|---|
| 2,350,446 | Carruthers | June 6, 1944 |
| 2,407,210 | Weissberger | Sept. 3, 1946 |

OTHER REFERENCES

Degering, Org. Nitrogen Compounds, pages 397 and 491 (1945), University Litho Printers.

Gabriel et al., Berichte, 57, 305 (1924).